(12) United States Patent
Umeno et al.

(10) Patent No.: US 7,697,590 B2
(45) Date of Patent: Apr. 13, 2010

(54) COMMUNICATING APPARATUS AND COMMUNICATING METHOD

(75) Inventors: Ken Umeno, Tokyo (JP); Akio Hasegawa, Tokyo (JP); Minghui Kao, Saitama (JP)

(73) Assignees: Japan Science and Technology Agency, Saitama (JP); National Institute of Information and Communications Technology, Incorporated Administrative Agency, Tokyo (JP)

( * ) Notice: Subject to any disclaimer, the term of this patent is extended or adjusted under 35 U.S.C. 154(b) by 974 days.

(21) Appl. No.: 10/560,574

(22) PCT Filed: Jun. 11, 2004

(86) PCT No.: PCT/JP2004/008592

§ 371 (c)(1),
(2), (4) Date: Apr. 12, 2006

(87) PCT Pub. No.: WO2004/112271

PCT Pub. Date: Dec. 23, 2004

(65) Prior Publication Data

US 2006/0209926 A1      Sep. 21, 2006

(30) Foreign Application Priority Data

Jun. 13, 2003   (JP)   ............................... 2003-170005

(51) Int. Cl.
*H04B 1/00* (2006.01)
(52) U.S. Cl. .................. 375/130; 375/141; 375/219; 375/142; 708/250; 702/179; 370/335; 370/330

(58) Field of Classification Search ................. 375/130, 375/141, 219, 142; 708/250; 702/179; 370/335, 370/330
See application file for complete search history.

(56) References Cited

U.S. PATENT DOCUMENTS 6,477,481 B1 * 11/2002 Umeno ....................... 702/179
(Continued)

FOREIGN PATENT DOCUMENTS

JP      2000-089182      3/2000
(Continued)

OTHER PUBLICATIONS

McGillem et al.; A chaotic direct-sequence spread-spectrum communication system; IEEE Transactions on Communications; vol. 42, Issue: 234; pp. 1524-1527; Apr. 1994.*

*Primary Examiner*—Sudhanshu C Pathak
(74) *Attorney, Agent, or Firm*—K&L Gates LLP (57) ABSTRACT

A chaos spreading code c(n) is inputted to a spreading unit 32. Data D1 and c(n) are multiplied in the spreading unit 32. A chaos spreading code d(n) is inputted to a spreading unit 42. Data D2 and d(n) are multiplied in the spreading unit 42. The chaos spreading codes c(n) and d(n) orthogonally cross each other. Outputs of the spreading units 32 and 42 are added by an adder 35 and transmitted through a transmitting unit 36 to a transmission path 38. By making an initial value which is set in a chaos sequence generator having a construction of a digital circuit different, the chaos spreading codes which orthogonally cross can be formed. Since the chaos spreading codes c(n) and d(n) orthogonally cross, an orthogonal modulating unit having a construction of an analog circuit for amplitude-modulating carriers which orthogonally cross can be made unnecessary and the construction can be simplified.

18 Claims, 10 Drawing Sheets

U.S. PATENT DOCUMENTS

| | | | |
|---|---|---|---|
| 6,661,831 B1 * | 12/2003 | Umeno | 375/142 |
| 7,099,366 B2 * | 8/2006 | Umeno | 375/130 |
| 2002/0196839 A1 * | 12/2002 | Hunton | 375/130 |
| 2003/0161286 A1 * | 8/2003 | Li | 370/335 |
| 2004/0190598 A1 * | 9/2004 | Seki et al. | 375/141 |
| 2005/0033785 A1 * | 2/2005 | Umeno et al. | 708/250 |
| 2005/0220051 A1 * | 10/2005 | Lavean | 370/330 |
| 2005/0249271 A1 * | 11/2005 | Lau et al. | 375/219 |

FOREIGN PATENT DOCUMENTS

| | | |
|---|---|---|
| JP | 3234202 | 9/2001 |
| JP | 2003-140885 | 5/2003 |

* cited by examiner

COMMUNICATING APPARATUS AND COMMUNICATING METHOD

TECHNICAL FIELD

The invention relates to a communicating apparatus and a communicating method in which chaos signals are used as spreading codes and, more particularly, to a spread spectrum communication system such as CDMA (Code Division Multiple Access).

BACKGROUND ART

The spread spectrum communication system for making communication by spreading an energy of a signal to a band width which is fairly wider than that of information has been known. According to the spread spectrum communication system, a spectrum of the signal is spread by using a spreading code. A pseudo-noise sequence (PN sequence) is used as a spreading code. There is an M sequence (Maximum-length linear shift-register sequence) as an example of the spreading code. A gold code obtained by arithmetically operating outputs of the two M sequences by the exclusive OR is used.

The CDMA system is a multiple accessing system using a function which can identify the user by the spreading code among the spread spectrum communication systems. Although the PN sequence such as an M sequence or the like has ordinarily been used as a spreading code hitherto, the CDMA using chaos spreading codes has been proposed. A technique of digitally forming the chaos spreading code has been disclosed in JP-A-2003-140885.

A point of realizing the communication of the spread spectrum communication system such as a CDMA by using the chaos spreading code has been disclosed in JP-B-3234202.

The chaos CDMA disclosed in the above Patent Document is a system which uses the chaos spreading code in place of the existing PN sequence such as an M sequence or the like and allocates one spreading code to one user. Therefore, it is considered to use orthogonal modulation in order to effectively use a channel. According to the conventional construction, however, there is such a problem that a modulator or a demodulator is necessary for orthogonal modulation and demodulation besides a spreading unit or an inverse spreading unit.

It is, therefore, an object of the invention to provide a communicating apparatus and a communicating method in which an increase in scale of hardware is suppressed and a communication channel can be effectively used.

DISCLOSURE OF INVENTION

To solve the foregoing problem, according to the first embodiment of the invention, there is provided a communicating apparatus which makes spreading by multiplying transmission data by a chaos spreading code and transmits a spreading output, comprising: first and second spreading units; and a transmitting unit to which output signals of the first and second spreading units are inputted, wherein a first chaos spreading code which is inputted to the first spreading unit and a second chaos spreading code which is inputted to the second spreading unit orthogonally cross each other, that is, an absolute value of a normalized correlation coefficient of the first and second chaos spreading codes is equal to or less than 0.3.

According to the second embodiment of the invention, there is provided a communicating method of making spreading by first and second chaos spreading codes which orthogonally cross each other.

According to the third embodiment of the invention, there is provided a communicating apparatus for receiving transmission data constructed by first and second spreading outputs which have been spread by first and second chaos spreading codes, in which the first and second chaos spreading codes orthogonally cross each other, that is, an absolute value of a normalized correlation coefficient of the first and second chaos spreading codes is equal to or less than 0.3, comprising: a receiving unit for receiving the first and second spreading outputs; first and second inverse spreading units for inversely spreading the first and second spreading outputs received by the receiving unit by the first and second chaos spreading codes, respectively; and synchronizing means for synchronizing the first and second chaos spreading codes with a transmitting side.

According to the fourth embodiment of the invention, there is provided a communicating method of making inverse spreading by first and second chaos spreading codes which are synchronized with a transmitting side and orthogonally cross each other.

As for the orthogonal crossing in each embodiment, when an absolute value of a normalized correlation coefficient of the first and second chaos spreading codes is equal to or less than 0.3, it is determined that those codes orthogonally cross each other.

According to the invention, since the first and second chaos spreading codes orthogonally cross each other, the spreading outputs which were respectively spread by the first and second chaos spreading codes are transmitted through the same channel, and on the receiving side, by making the inverse spreading by the synchronized first and second chaos spreading codes, the transmission data can be demodulated. Since the modulator for the orthogonal modulation becomes unnecessary besides the spreading units, the hardware can be simplified.

BEST MODE FOR CARRYING OUT THE INVENTION

Figure 1:
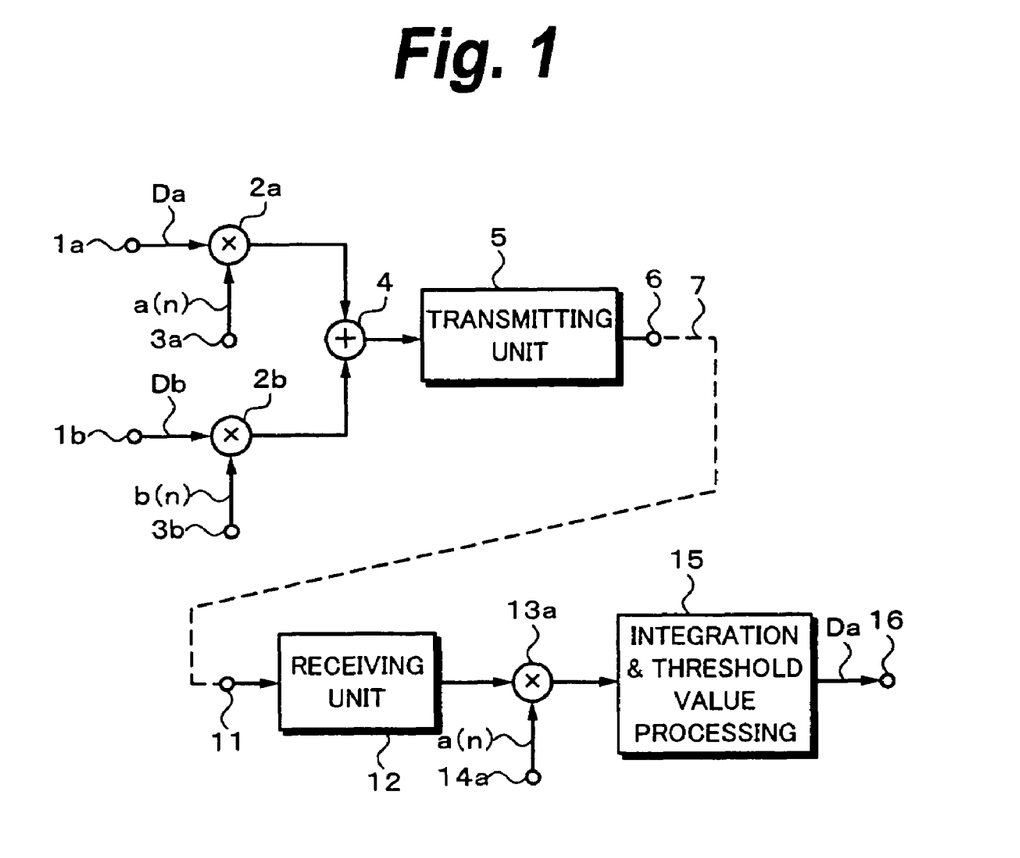
FIG. 1 is a block diagram showing a communication system using chaos spreading codes to which the invention can be applied.

An embodiment of the invention will be described hereinbelow with reference to the drawings. For easily understanding the invention, the CDMA using the chaos spreading codes which has already been proposed (hereinafter, properly referred to as a chaos CDMA) will be explained with reference to FIG. 1. Reference numeral 1a denotes an input terminal of a data sequence Da to be transmitted by a transmitter A and 1b indicates an input terminal of a data sequence Db to be transmitted by a transmitter B. Although an example of the two transmitters is shown in the example of FIG. 1, the invention can be also applied to the case of transmitting data of three or more transmitters.

The data Da and Db are supplied to spreading units 2a and 2b in order to directly make spreading, respectively. A chaos spreading code a(n) is inputted to the spreading unit 2a from an input terminal 3a. The data Da and the chaos spreading code a(n) are multiplied in the spreading unit 2a. Another chaos spreading code b(n) is inputted to the spreading unit 2b from an input terminal 3b. The data Db and the chaos spreading code b(n) are multiplied in the spreading unit 2b. Outputs of the spreading units 2a and 2b are added by an adder 4 and an addition signal passes through a transmitting unit 5 and is transmitted from a transmission output terminal 6 to a transmission path 7 (shown by a broken line) such as wired line, wireless manner, optical cable, or the like. The transmitting unit 5 is realized by an antenna, an interface such as a LAN (Local Area Network), or the like in correspondence to the transmission path 7.

The signal transmitted through the transmission path 7 is supplied from a reception input terminal 11 to a receiving unit 12. The receiving unit 12 is realized by the antenna, the interface such as a LAN (Local Area Network), or the like in correspondence to the transmitting unit 5. An output of the receiving unit 12 is supplied to an inverse spreading unit 13a. When the receiver corresponding to the transmitter A is presumed, the chaos spreading code a(n) is inputted to the inverse spreading unit 13a from an input terminal 14a. The synchronization using the same chaos spreading code a(n) as that used for the spreading is obtained by correlation detection or the synchronization is obtained from information which has separately been transmitted in a secure manner.

In the inverse spreading unit 13a, the reception data and the chaos spreading code a(n) are multiplied and a multiplication result is processed by an integration and threshold value processing unit 15. The data Da of the transmitter A is decoded and extracted from the integration and threshold value processing unit 15 to an output terminal 16.

Figure 2A:
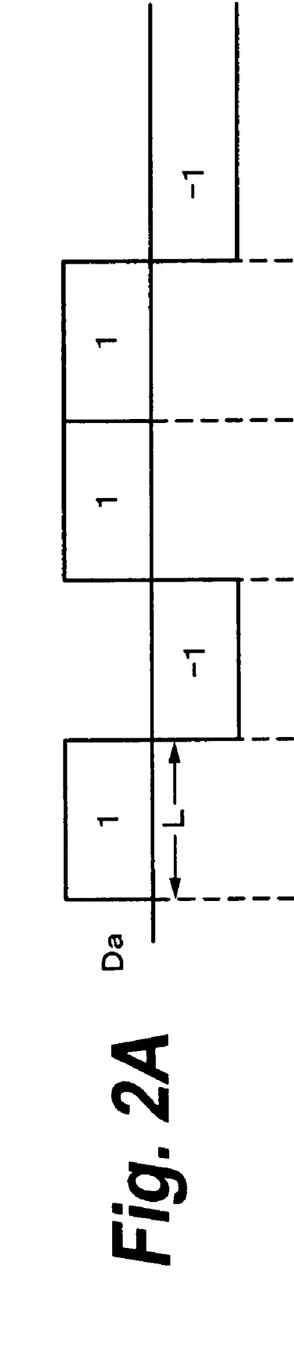
FIG. 2 is a waveform diagram for use in explanation of FIG. 1.
Figure 2B:
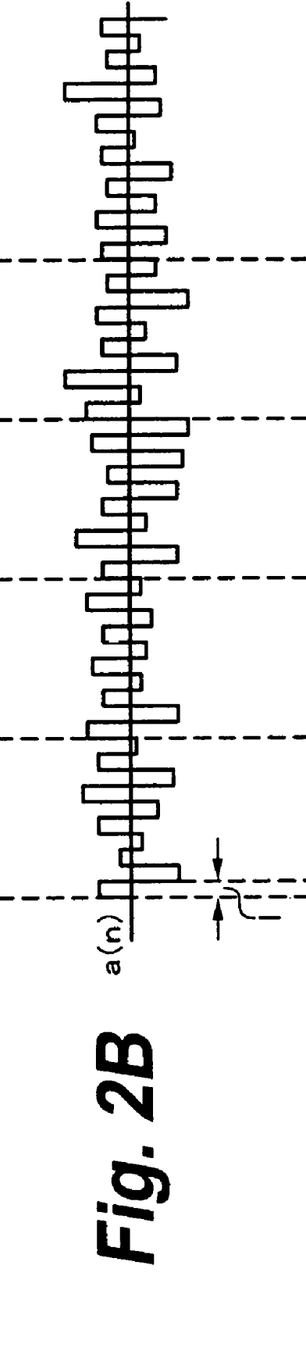
Figure 2C:
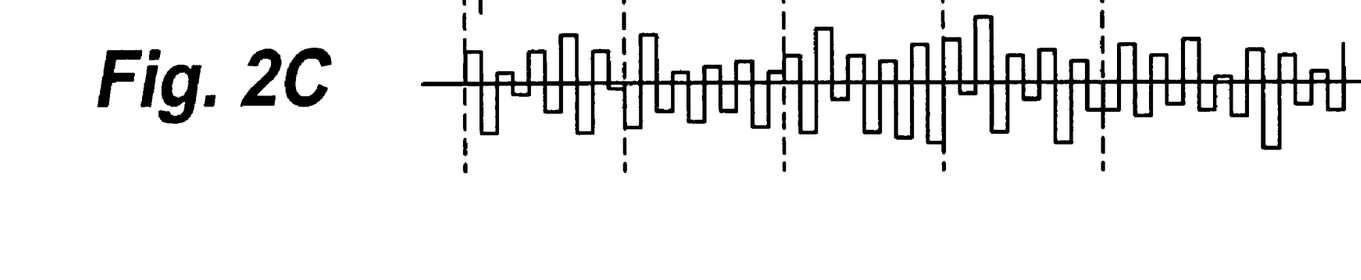

FIG. 2A shows, for example, the transmission data Da and Da is a binary signal of "−1" and "1". The data may be a binary signal of "0" and "1". FIG. 2B shows the chaos spreading code a(n) in which the sum (power) of the square of an amplitude value is constant. A value of the chaos spreading code is a multivalue. The data Da and the chaos spreading code a(n) are multiplied in the spreading unit 2a and data after the spreading shown in FIG. 2C is obtained. A period (chip length) l of the chaos spreading code a(n) is set to a proper value as compared with a bit length L of the data.

The chaos spreading code is formed by the chaos mapping using the Chebyshev's polynomial. A Chebyshev's polynomial of the p-th degree is defined by the following equation (1).

$$T_p(\cos\theta) = \cos(p\theta) \quad (1)$$

A spreading code sequence is obtained by using this Chebyshev's polynomial as mapping. For example, when p=2, $T_p(x)$ is expressed by $$T_2(x) = 2x^2 - 1 \quad (2)$$

Figure 3:
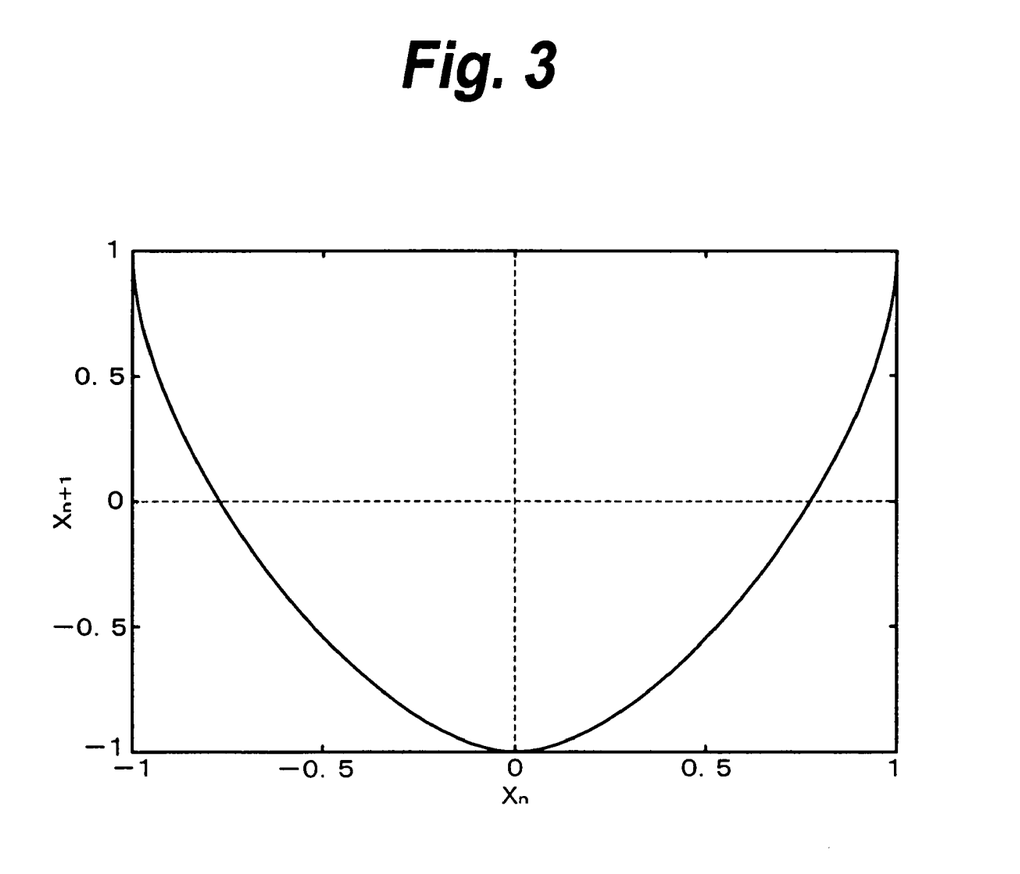
FIG. 3 is a schematic diagram showing mapping by a quadratic Chebyshev's polynomial.

The mapping to obtain the spreading code sequence is as shown by the following equation (3) and shown in FIG. 3.

$$X_{n+1} = 2x_n^2 - 1 \quad (3)$$

The sequence obtained from such mapping has excellent correlation characteristics as compared with those of the gold code sequence or the like used in the existing CDMA system. The gold code sequence is a sequence obtained by arithmetically operating outputs of two different M sequences by an exclusive OR gate.

The chaos spreading code generator has a construction in which the mapping shown by the equation (3) is realized by a digital circuit. To reduce a circuit scale, it is more advantageous to execute the arithmetic operation by a fixed point arithmetic operation than that in the case of executing a floating point arithmetic operation. However, if the mapping is executed as it is by the fixed point arithmetic operation, a problem in which a short period solution or a fixed point is obtained occurs.

Figure 4:
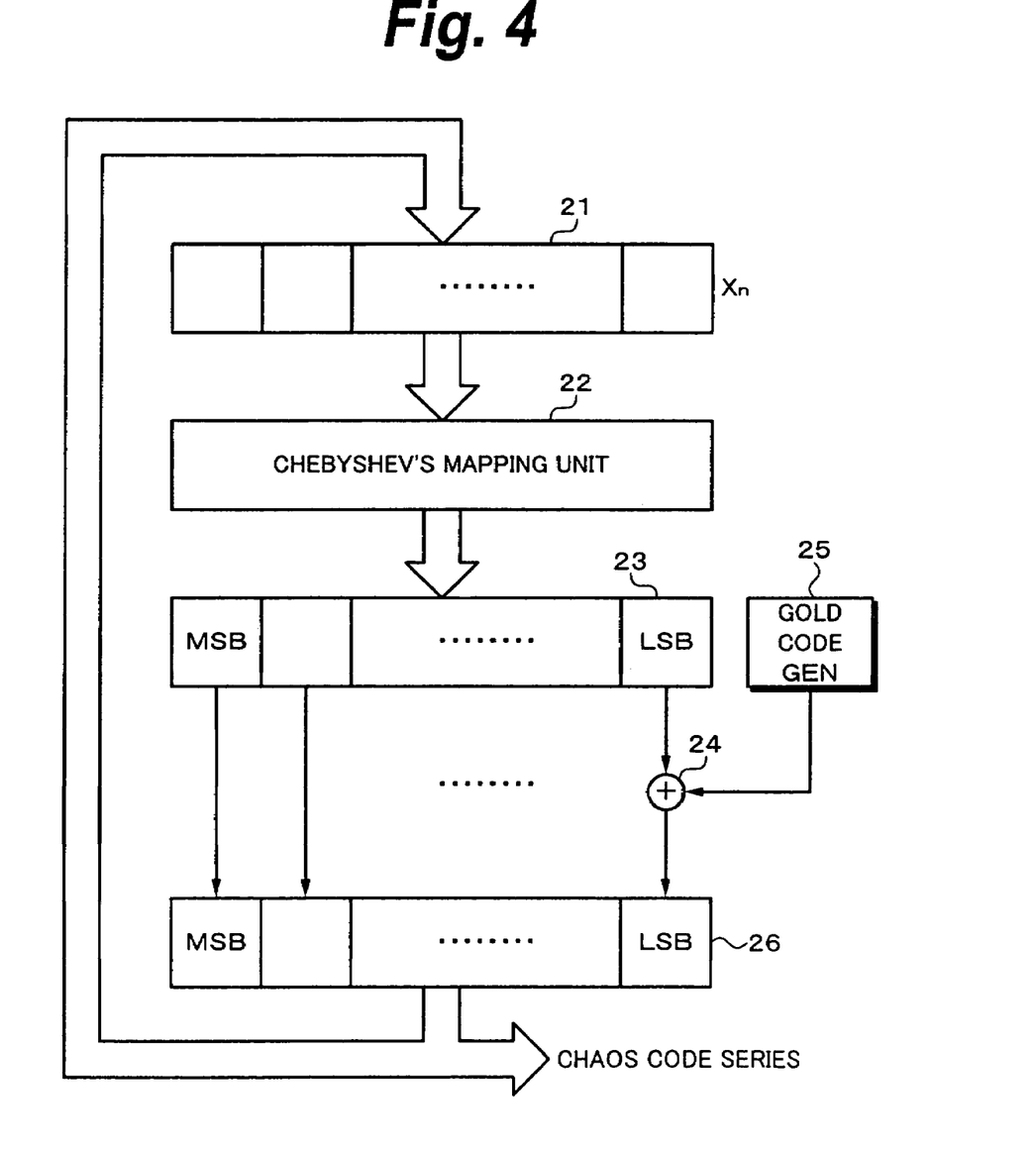
FIG. 4 is a block diagram of an example of a chaos sequence generator for generating the chaos spreading codes.

To avoid such a problem, a chaos spreading code sequence is generated by using a method called "bit harnessing". FIG. 4 shows an example of a chaos spreading code generator (for example, a degree is equal to 2) using the bit harnessing. In FIG. 4, a register 21 provides an initial value. The initial value is a sequence of real numbers in a range where they are larger than −1 and less than 1.

Reference numeral 22 denotes a Chebyshev's mapping unit to arithmetically operate the data $X_{n+1}$ from the data $X_n$ from the register 21 in accordance with the equation (3). The Chebyshev's mapping unit 22 can be realized by a polynomial arithmetic operation by a computer or by a combination of an adding/subtracting circuit and a multiplier. A value to designate the degree may be inputted to the Chebyshev's mapping unit instead of fixing a degree of the Chebyshev's polynomial. The output data $X_{n+1}$ of the Chebyshev's mapping unit 22 is stored into a register 23.

The LSB (Least Significant Bit) of the data stored in the register 23 is supplied to an exclusive OR gate 24. The gold code from a gold code generator 25 is supplied as another input of the exclusive OR gate 24.

Bits other than the LSB from the register 23 and the output bit of the exclusive OR gate 24 are stored into a register 26. An output of the register 26 is outputted as a chaos spreading code of a predetermined bit length, fed back to the register 21, and used for generation of the next code.

A method of randomizing the LSB by a sequence of random numbers such as a gold sequence as mentioned above is called "bit harnessing". By the bit harnessing, the period of the output sequence can be elongated by a few to tens of times as compared with that in the case where the bit harnessing is not executed, so that the more desirable chaos spreading code sequence can be generated.

Figure 5:
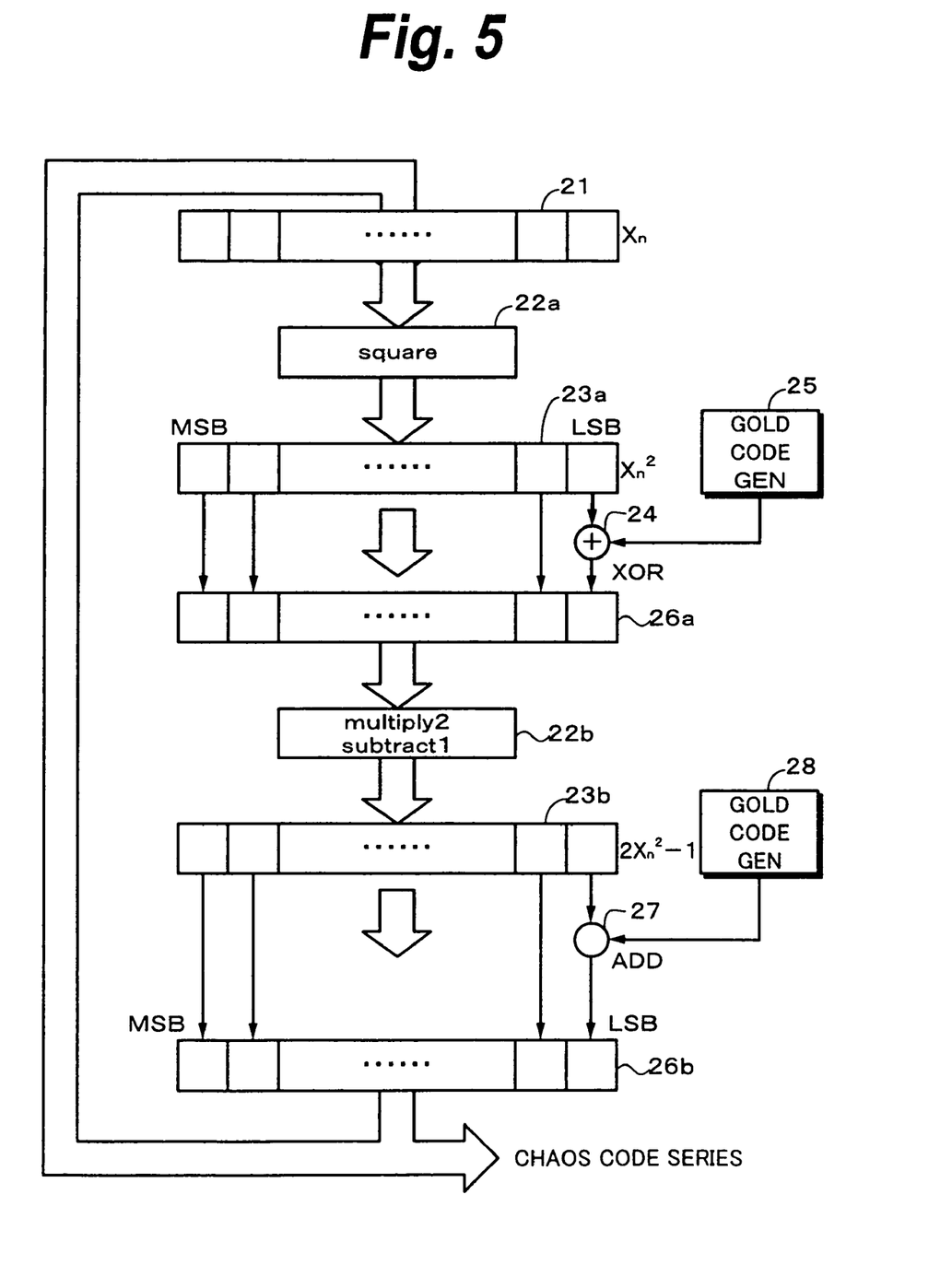
FIG. 5 is a block diagram of another example of the chaos sequence generator for generating the chaos spreading code.

FIG. 5 shows another example of the generator of the chaos spreading code sequence. The initial value in the register 21 is squared by an arithmetic operating circuit 22a and $X_n^2$ is stored into a register 23a. The LSB of an output of the register 23a and the gold code generated by the gold code generator 25 are supplied to the exclusive OR gate 24, randomized, and stored into a register 26a. An output of the register 26a is supplied to an arithmetic operating circuit 22b and multiplied by 2. By subtracting "1" from a multiplication result, $2X_n^2-1$ is obtained and stored into a register 23b. The LSB of an output of the register 23 b and a gold code generated by a gold code generator 28 are supplied to an adder 27, randomized, and stored into a register 26b. A chaos spreading code is obtained from the register 26b. By executing a process of the exclusive OR gate 24 and a process of the adder 27, the period of the output sequence can be extended more.

The generation of the chaos spreading sequence mentioned above can be also executed by software. In this case, the following steps are sequentially executed: a step in which the initial value is inputted and stored into a storing unit; a step of executing the mapping once or divisionally executing it a plurality of number of times by the Chebyshev's mapping; a step of executing the process of the bit harnessing (randomization of a predetermined bit such as an LSB or the like); and a process for outputting the formed sequence and returning it to the storing unit. Further, such a method may be stored as a program into a storing medium which can be read out by a computer.

Figure 6:
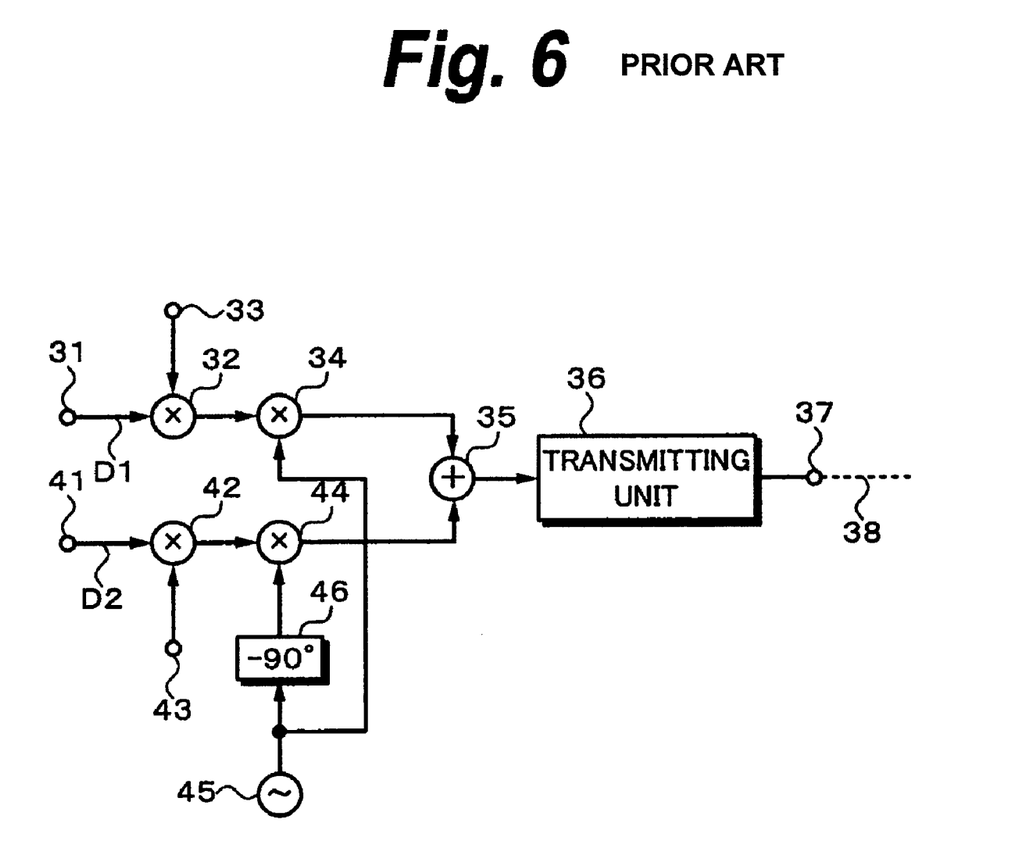
FIG. 6 is a block diagram of an example of a conventional transmitting apparatus according to orthogonal modulation.

Generally, digital modulation and demodulation are executed to effectively use a frequency. For example, there is a method of using the orthogonal modulation as a general method. Also in the spread spectrum communication system, hitherto, it has been combined with the orthogonal modulation. FIG. 6 shows an example in which the spread spectrum communication system and the orthogonal modulation are combined. In FIG. 6, reference numeral 31 denotes an input terminal of a data sequence D1 to be transmitted by the transmitter A and 41 indicates an input terminal of another data sequence D2 to be transmitted by the same transmitter A.

The data D1 and D2 are supplied to spreading units 32 and 42 in order to directly make spreading, respectively. The PN sequence such as M sequence, gold code, or the like is inputted to the spreading unit 32 from an input terminal 33. The data D1 and the PN sequence are multiplied in the spreading unit 32. Another PN sequence different from the PN sequence for D1 is inputted to the spreading unit 42 from an input terminal 43. The data D2 and another PN sequence are multiplied in the spreading unit 42.

An output of the spreading unit 32 is supplied to a multiplier 34 and an output of the spreading unit 42 is supplied to a multiplier 44. A carrier of a cosine wave is supplied to the multiplier 34 from a carrier generator 45. A carrier of a sine wave obtained by shifting the carrier by 90°, that is, the carrier which orthogonally crosses the carrier of the cosine wave is supplied to the multiplier 44. Amplitude-modulated signals which are outputted from the multipliers 34 and 44 are added by an adder 35. An output signal of the adder 35 passes through a transmitting unit 35 and is transmitted from a transmission output terminal 36 to a transmission path 37 (shown by a broken line) such as wired line, wireless manner, optical cable, or the like. The transmitting unit 35 is realized by a frequency converter, an antenna, an interface such as a wired or wireless LAN, or the like in correspondence to the transmission path 37.

Although not-shown, on the receiving side, the carrier is reproduced from a reception signal received by a receiving unit. By synchronously detecting the reception signal by the reproduced carrier and the carrier obtained by shifting the reproduced carrier by 90°, respectively, the data sequences D1 and D2 can be obtained.

As shown in FIG. 6 and mentioned above, in the conventional orthogonal modulation, in addition to the spreading units for the transmission data for the spread spectrum communication, the multipliers for the orthogonal modulation are separately needed. In an embodiment of the invention which will be explained hereinbelow, since chaos spreading codes which are used as spreading codes orthogonally cross each other, the multipliers for the orthogonal modulation can be made unnecessary and the construction for the modulation and demodulation can be simplified.

Figure 7:
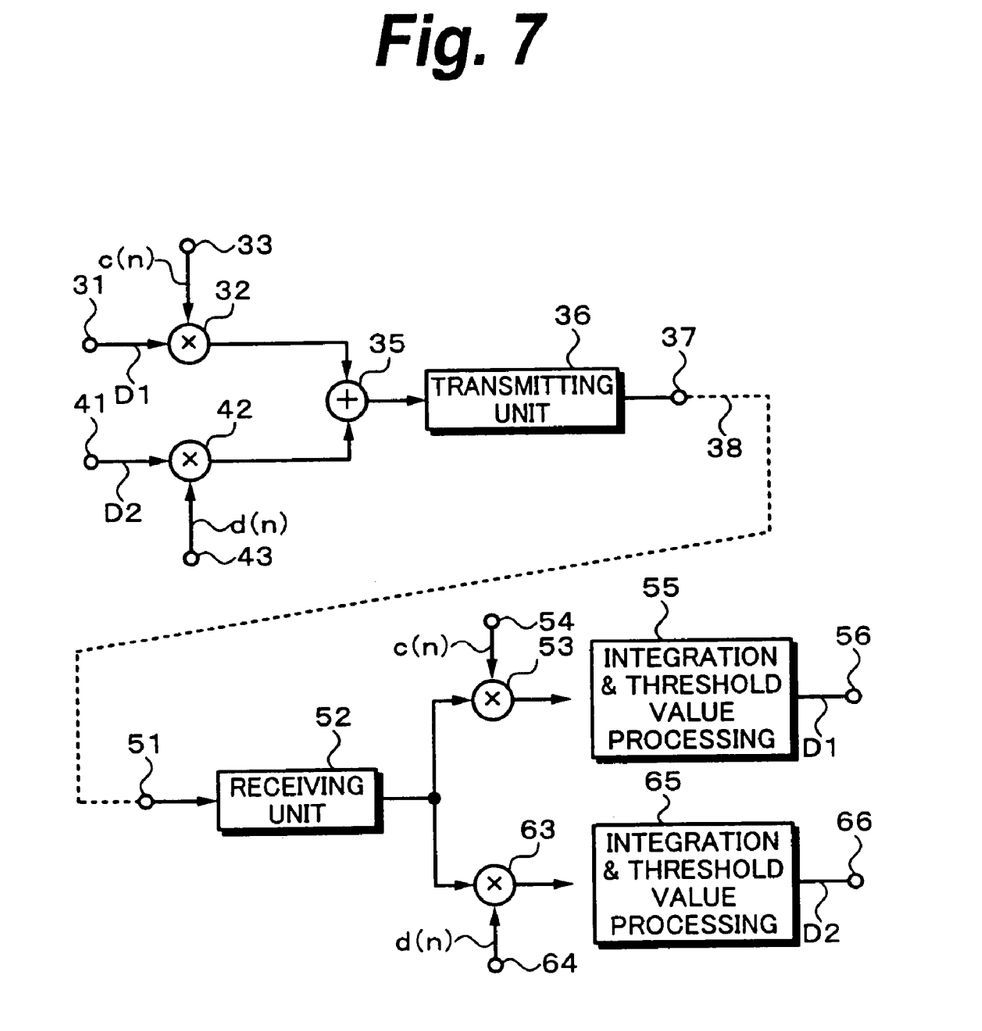
FIG. 7 is a block diagram of a communicating apparatus according to an embodiment of the invention.

FIG. 7 shows a construction of the embodiment of the invention. In FIG. 7, reference numeral 31 denotes the input terminal of the data sequence D1 to be transmitted by the transmitter A and 41 indicates the input terminal of the data sequence D2 to be transmitted by the same transmitter A. Although not shown in FIG. 6, a transmitting apparatus to transmit data of another transmitter is also similarly constructed. The invention is not limited to the multiple access but can be also applied to communication of a one-to-one correspondence relationship.

The data D1 and D2 are supplied to the spreading units 32 and 42 in order to directly make the spreading, respectively. A chaos spreading code c(n) is inputted to the spreading unit 32 from the input terminal 33. The data D1 and the chaos spreading code c(n) are multiplied in the spreading unit 32. A chaos spreading code d(n) is inputted to the spreading unit 42 from the input terminal 43. The data D2 and the chaos spreading code d(n) are multiplied in the spreading unit 42. The chaos spreading code c(n) and the chaos spreading code d(n) are generated by the chaos sequence generator having the construction of the digital circuit shown in FIG. 4 or 5.

The outputs of the spreading units 32 and 42 are added by the adder 35. An output signal of the adder 35 passes through the transmitting unit 36 and is transmitted from the transmission output terminal 37 to the transmission path 38 (shown by the broken line) such as wired line, wireless manner, optical cable, or the like. The transmitting unit 36 is realized by the frequency converter, antenna, interface such as a wired or wireless LAN (Local Area Network), or the like in correspondence to the transmission path 38. For example, the transmitting unit 36 is constructed by an up-converter for up-converting the signal into a radio signal of 2.4 GHz and the antenna. The transmitting unit 36 may execute analog modulation. It is also possible to use a construction in which the output signals of the spreading units 32 and 42 are up-converted into the carriers of predetermined frequencies which orthogonally cross each other, the up-converted outputs are added, and an addition signal is transmitted from the antenna.

In the embodiment, it is necessary that the chaos spreading codes c(n) and d(n) orthogonally cross each other. As for the orthogonal crossing mentioned here, when an absolute value of a normalized correlation coefficient of the first chaos spreading code c(n) and the second chaos spreading codes d(n) is equal to or less than 0.3, it is determined that those codes orthogonally cross each other. By making the initial value which is set into the register 21 in the chaos sequence generator having the construction of the digital circuit shown in FIG. 4 or 5 different, the chaos spreading codes which orthogonally cross each other can be formed. Unlike the conventional construction shown in FIG. 6, since the chaos spreading codes c(n) and d(n) orthogonally cross each other, the orthogonal crossing modulating unit having a construction of an analog circuit to amplitude-modulate the carriers which orthogonally cross each other can be made unnecessary and the construction can be simplified. It is assumed that the sum of the squares of amplitude values of the chaos spreading codes c(n) and d(n) is constant.

The signal transmitted through the transmission path 38 is supplied to a receiving unit 52 from a reception input terminal 51. The receiving unit 52 is realized by an antenna, a down-converter, an interface such as a LAN, and the like in correspondence to the transmitting unit 35. An output of the receiving unit 52 is supplied to inverse spreading units 53 and 63. When the receiver corresponding to the transmitter A is presumed, the chaos spreading code c(n) is inputted to the inverse spreading unit 53 from an input terminal 54 and the chaos spreading code d(n) is inputted to the inverse spreading unit 63 from an input terminal 64. The same chaos spreading codes c(n) and d(n) as those used for the spreading by the synchronizing method such as correlation detection or the like are used, respectively.

In the inverse spreading unit 53, the reception data and the chaos spreading code c(n) are multiplied and a multiplication result is processed by an integration and threshold value processing unit 55. One data D1 of the transmitter A is decoded and extracted from the integration and threshold value processing unit 55 to an output terminal 56. In the inverse spreading unit 63, the reception data and the chaos spreading code d(n) are multiplied and a multiplication result is processed by an integration and threshold value processing unit 65. The other data D2 of the transmitter A is decoded and extracted from the integration and threshold value processing unit 65 to an output terminal 66.

Figure 8:
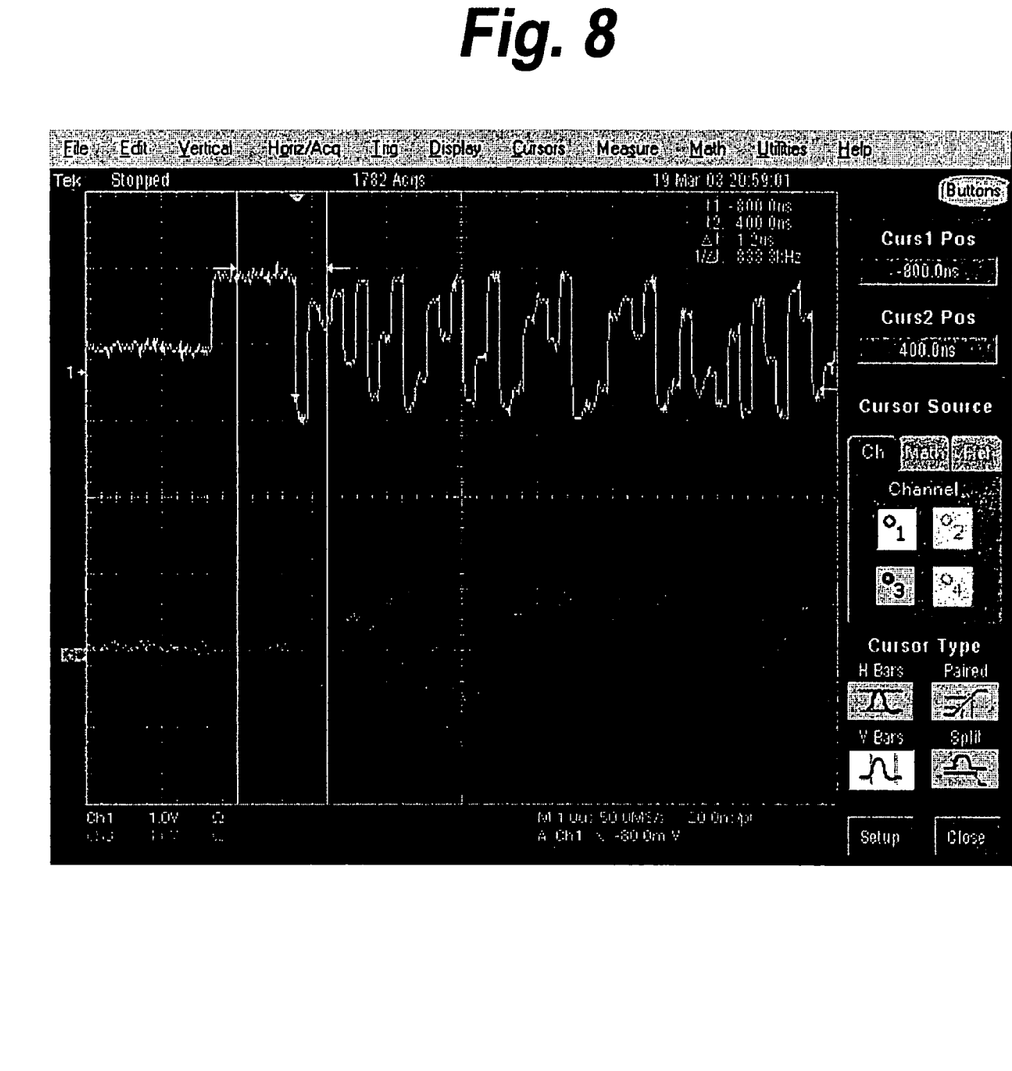
FIG. 8 is a schematic diagram showing measurement results of two output waveforms which were spread by the chaos spreading codes which orthogonally cross each other.

With respect to the foregoing embodiment, observation results of the waveforms of the transmission data in the case where both of the data D1 and D2 are the data having the same positive amplitude is shown in FIG. 8. That is, FIG. 8 shows the results in the case where the waveforms of the signals obtained by D/A converting the signals on the output side of the spreading units 32 and 42 are observed by an oscilloscope. In this example, the waveform shown at the upper stage is an output analog waveform of the spreading unit 32 and the waveform shown at the lower stage is an output analog waveform of the spreading unit 42. In the waveform at the upper stage, a large positive value continues. In the waveform at the lower stage, a large negative value continues. Each of those portions is a header added so as to easily obtain the synchronization and to enable a trigger to be easily made upon observation and is not concerned with the chaos code.

Figure 9:
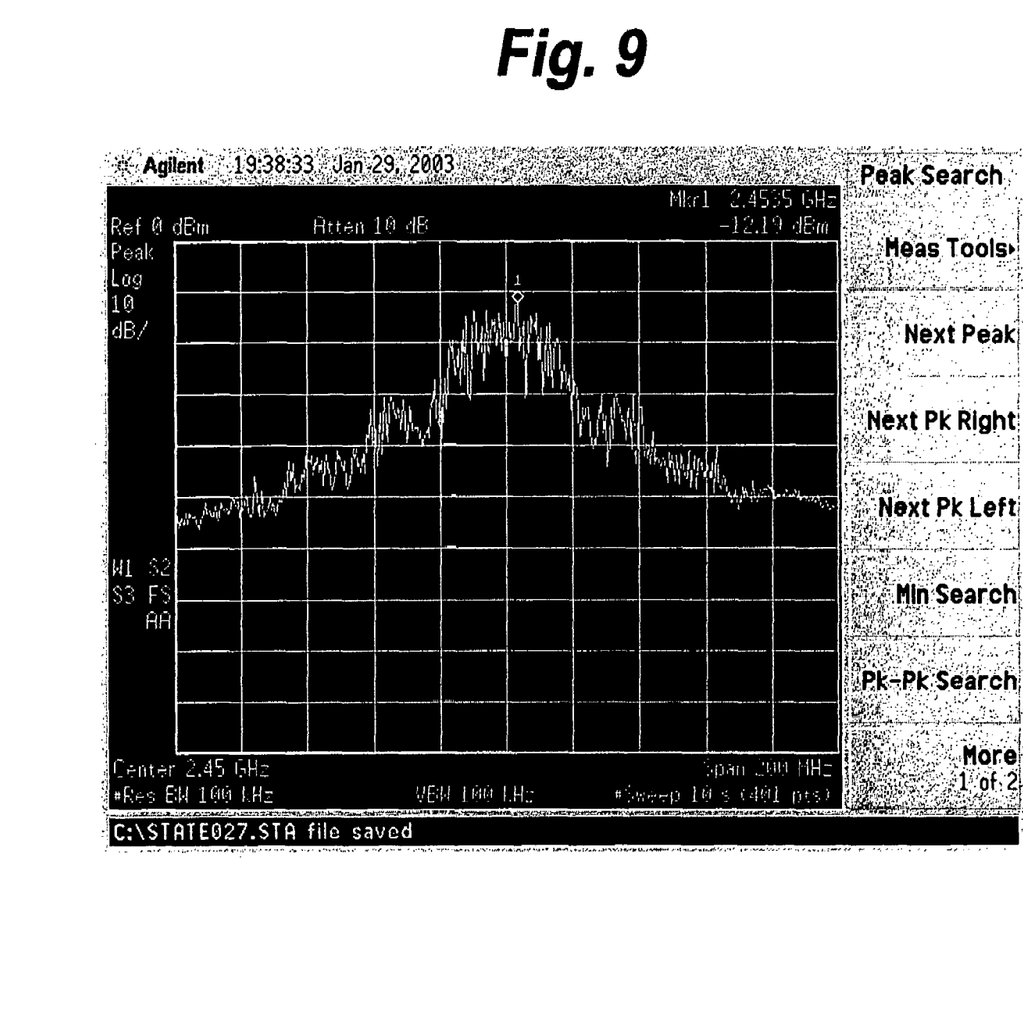
FIG. 9 is a schematic diagram showing measurement results of frequency spectra of output signals which were spread by the chaos spreading codes which orthogonally cross each other.

FIG. 9 shows frequency characteristics of an output of an RF signal which has been up-converted into, for example, a band of 2.4 GHz by the transmitting unit 36. The center frequency is equal to 2.45 GHz. The state where a spectrum of the transmission signal has been spread will be understood from FIG. 9.

Figure 10:
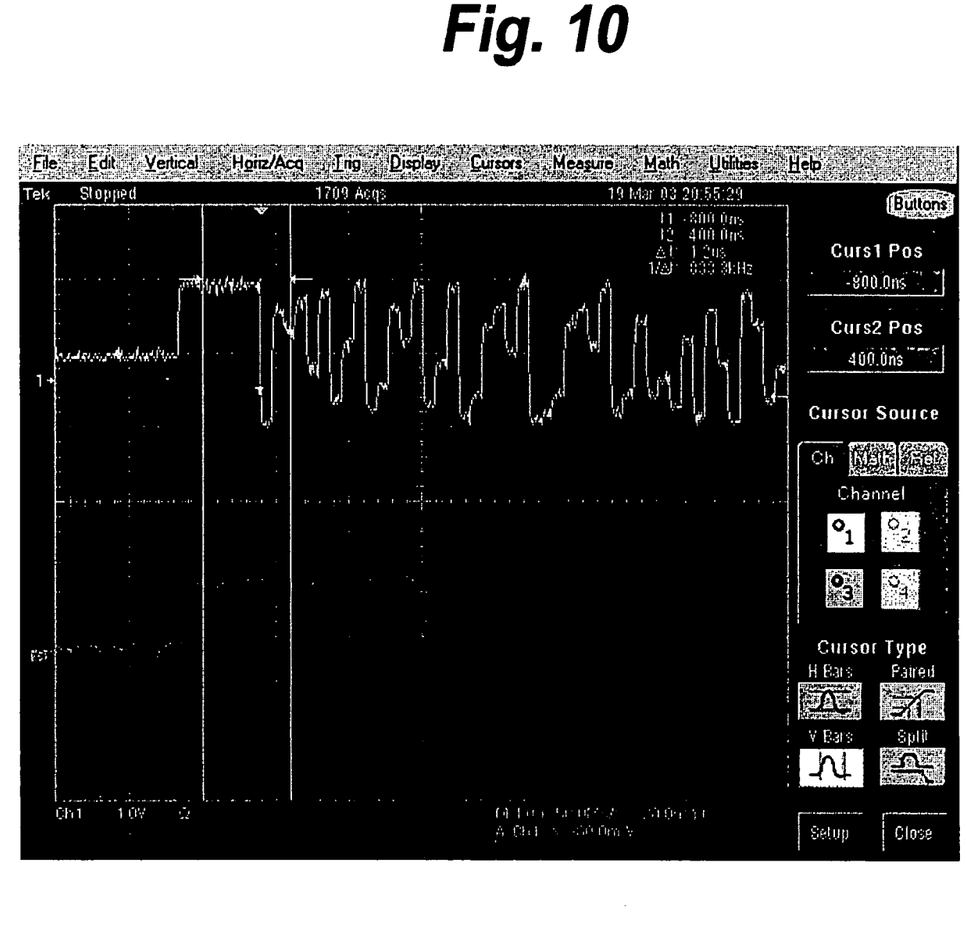
FIG. 10 is a schematic diagram showing measurement results of a transmission waveform and a reception waveform.

Further, the transmission waveform and the reception waveform in the case where the transmission signal is received by the receiving unit 52 are shown in FIG. 10 for a comparison. In FIG. 10, the waveform shown at the upper stage is an output analog waveform (transmission waveform) of the spreading unit 32 and the waveform shown at the lower stage is an analog waveform (reception waveform) which has been received and is supplied to the inverse spreading unit 53. As will be understood from FIG. 10, the transmission waveform and the reception waveform are almost identical and the data D1 can be obtained by inversely spreading by the chaos spreading code c(n) used upon transmission.

The invention is not limited to the embodiment and the like of the invention mentioned above but various modifications and applications are possible within the scope without departing from the spirit of the invention. For example, although the two chaos spreading codes which orthogonally cross each other have been used in the foregoing example, it is also possible to make the spreading by a larger number of, for example, four chaos spreading codes which orthogonally cross each other.

According to the invention, by making the spreading by the chaos spreading codes which orthogonally cross each other, using efficiency of the channel can be improved. Since the modulating unit for the orthogonal modulation or the demodulating unit is unnecessary besides the spreading units, the construction of the hardware can be simplified.

The invention claimed is:

1. A communicating apparatus which makes spreading by multiplying transmission data by a chaos spreading code and transmits a spreading output, the communicating apparatus comprising:

a first and second spreading units; and a transmitting unit to which output signals of said first and second spreading units are inputted;

wherein a first chaos spreading code which is inputted to said first spreading unit and a second chaos spreading code which is inputted to said second spreading unit orthogonally cross each other, wherein an absolute value of a normalized correlation coefficient of said first and second chaos spreading codes is equal to or less than 0.3; and further wherein said first and second chaos spreading codes are formed by a chaos spreading code generator comprising:

a storing unit in which an initial value is set;

a mapping unit for executing mapping once in which a map according to a Chebyshev's polynomial has been applied to the value that is outputted from said storing unit or for divisionally executing said mapping a plurality of number of times;

randomizing means for randomizing a least significant bit of an output of said mapping unit; and a path for outputting the output of said mapping unit including said randomized least significant bit, as said chaos spreading code, and returning said output to said storing unit, and said initial value is made different between said first and second chaos spreading codes.

2. The communicating apparatus of claim 1, wherein a sum of squares of amplitude values of said first and second chaos spreading codes is constant.

3. The communicating apparatus of claim 1, wherein a user is identified by said first and second chaos spreading codes.

4. The communicating apparatus of claim 1, wherein said transmitting unit is a radio transmitting unit for:

(a) adding the output signals of said first and second spreading units;

(b) up-converting an addition output into a predetermined carrier frequency; and (c) transmitting an up-converted output from an antenna.

5. The communicating apparatus of claim 1, wherein said transmitting unit is a radio transmitting unit for:

(a) up-converting each of the output signals of said first and second spreading units into carriers which have predetermined frequencies and orthogonally cross each other;

(b) adding up-converted outputs; and (c) transmitting an addition output from an antenna.

6. A communicating method which makes spreading by multiplying transmission data by a chaos spreading code and transmits a spreading output, the communicating method comprising:

spreading the transmission data by first and second chaos spreading codes, respectively, and forming first and second spreading outputs; and transmitting said first and second spreading outputs;

wherein said first chaos spreading code and said second chaos spreading code orthogonally cross each other, wherein an absolute value of a normalized correlation coefficient of said first and second chaos spreading codes is equal to or less than 0.3; and wherein said first and second chaos spreading codes are formed by a chaos spreading code generating method comprising:

setting an initial value into a storing unit;

executing mapping once in which a map according to a Chebyshev's polynomial has been applied to the value that is outputted from said storing unit or divisionally executing said mapping a plurality of number of times;

randomizing a least significant bit of a mapping output; and outputting the mapping output including said randomized least significant bit, as said chaos spreading code, and returning said output to said storing unit, and said initial value is made different between said first and second chaos spreading codes.

7. The communicating method of claim 6, wherein a sum of squares of amplitude values of said first and second chaos spreading codes is constant.

8. The communicating method of claim 6, wherein a user is identified by said first and second chaos spreading codes.

9. The communicating method of claim 6, further comprising:

adding said first and second spreading outputs;

up-converting an addition output into a predetermined carrier frequency; and transmitting an up-converted output from an antenna.

10. The communicating method of claim 6, further comprising the steps of:

up-converting each of output signals of said first and second spreading units into carriers which have predetermined frequencies and orthogonally cross each other; and adding up-converted outputs and transmitting an addition output from an antenna.

11. A communicating apparatus for receiving transmission data constructed by first and second spreading outputs which have been spread by first and second chaos spreading codes, in which said first and second chaos spreading codes orthogonally cross each other, wherein an absolute value of a normalized correlation coefficient of said first and second chaos spreading codes is equal to or less than 0.3, the communicating apparatus comprising:

a receiving unit for receiving said first and second spreading outputs;

first and second inverse spreading units for inversely spreading said first and second spreading outputs received by said receiving unit by said first and second chaos spreading codes, respectively; and synchronizing means for synchronizing said first and second chaos spreading codes with a transmitting side;

wherein said first and second chaos spreading codes are formed by a chaos spreading code generator comprising:

a storing unit in which an initial value is set;

a mapping unit for executing mapping once in which a map according to a Chebyshev's polynomial has been applied to the value that is outputted from said storing unit or for divisionally executing said mapping a plurality of number of times;

randomizing means for randomizing a least significant bit of an output of said mapping unit; and a path for outputting the output of said mapping unit including said randomized least significant bit, as said chaos spreading code, and returning said output to said storing unit, and said initial value is made different between said first and second chaos spreading codes.

12. The communicating apparatus of claim 11, wherein a sum of squares of amplitude values of said first and second chaos spreading codes is constant.

13. The communicating apparatus of claim 11, wherein a user is identified by said first and second chaos spreading codes.

14. The communicating apparatus of claim 11, wherein said receiving unit:

(a) has an antenna;

(b) down-converts a reception signal of said antenna; and (c) supplies the down-converted signal to said first and second inverse spreading units.

15. A communicating method of receiving transmission data constructed by first and second spreading outputs which have been spread by first and second chaos spreading codes, in which said first and second chaos spreading codes orthogonally cross each other, wherein an absolute value of a normalized correlation coefficient of said first and second chaos spreading codes is equal to or less than 0.3, the communicating method comprising:

a receiving step of receiving said first and second spreading outputs;

first and second inverse spreading steps of inversely spreading said first and second spreading outputs received by said receiving unit by said first and second chaos spreading codes, respectively; and a synchronizing step of synchronizing said first and second chaos spreading codes with a transmitting side;

wherein said first and second chaos spreading codes are formed by a chaos spreading code generating method comprising:

setting an initial value into a storing unit;

executing mapping once in which a map according to a Chebyshev's polynomial has been applied to the value that is outputted from said storing unit or divisionally executing said mapping a plurality of number of times;

randomizing a least significant bit of a mapping output; and outputting the mapping output including said randomized least significant bit, as said chaos spreading code, and returning said output to said storing unit, and said initial value is made different between said first and second chaos spreading codes.

16. The communicating method of claim 15, wherein a sum of squares of amplitude values of said first and second chaos spreading codes is constant.

17. The communicating method of claim 15, wherein a user is identified by said first and second chaos spreading codes.

18. The communicating method of claim 15, wherein a reception signal of an antenna is down-converted and the down-converted signal is inversely spread.

* * * * *